Figure 1:
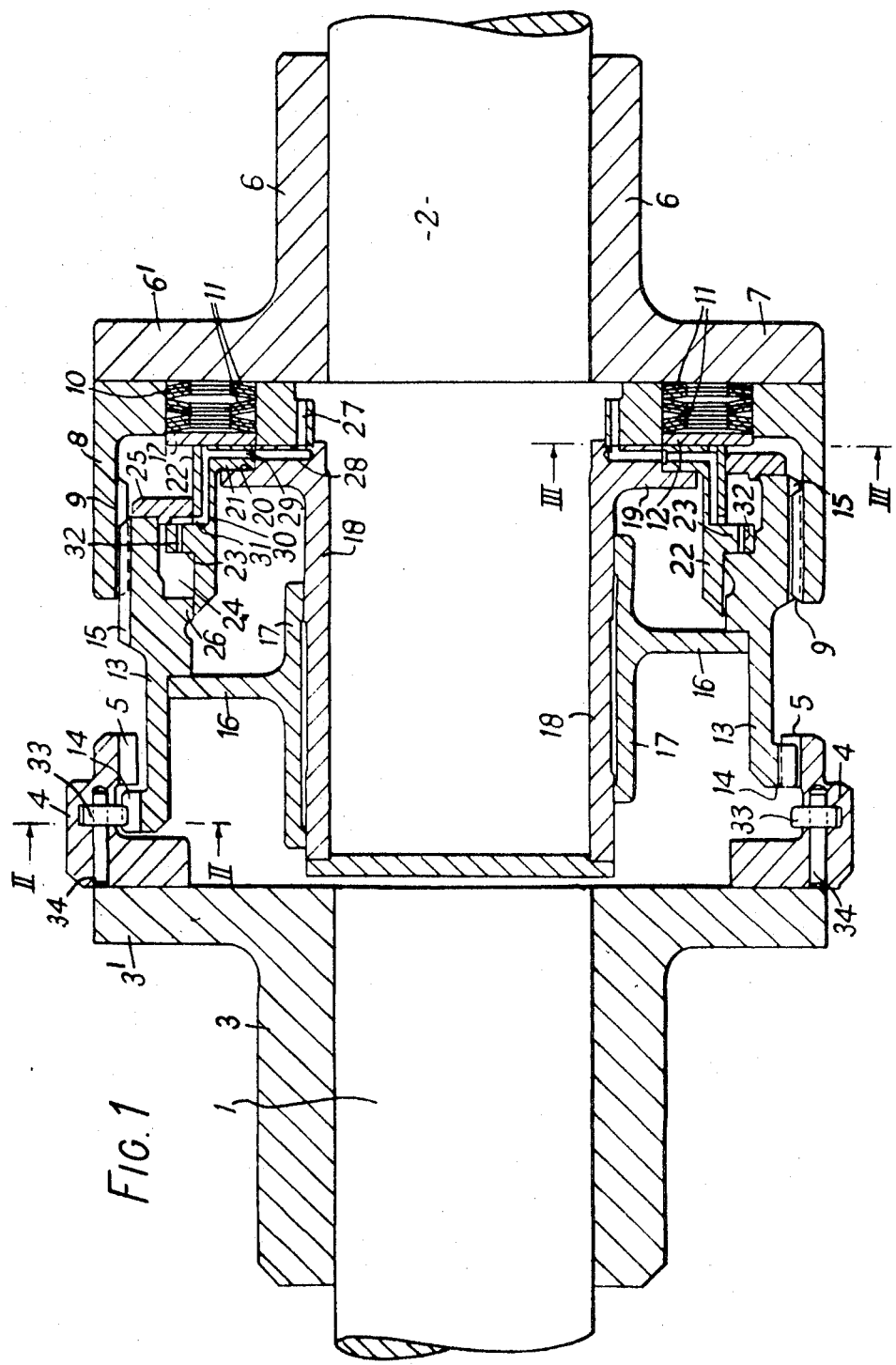

United States Patent

[11] 3,589,488

| [72] | Inventor | Herbert Arthur Clements |
| | | Oatlands Park, Weybridge, England |
| [21] | Appl. No. | 844,068 |
| [22] | Filed | July 23, 1969 |
| [45] | Patented | June 29, 1971 |
| [73] | Assignee | S.S.S. Patents Limited |
| | | London, England |
| [32] | Priority | Aug. 16, 1968 |
| [33] | | Great Britain |
| [31] | | 39373/68 |

[54] SYNCHRONOUS SELF-SHIFTING CLUTCH WITH YIELDING MEANS
4 Claims, 4 Drawing Figs.

[52] U.S. Cl. ................................................ 192/67,
192/55, 192/109
[51] Int. Cl. .................................................. F16d 23/02
[50] Field of Search............................................ 192/52,
53.8, 55, 109, 67 A

[56] References Cited
UNITED STATES PATENTS
989,007  4/1911  Hanson .................... 192/55

| 2,011,822 | 8/1935 | Munschauer................. | 192/55 (X) |
| 3,333,663 | 8/1967 | Clements et al. ............. | 192/53 (.8) (X) |
| 3,358,800 | 12/1967 | Clements..................... | 192/67 (A) |
| 3,395,782 | 8/1968 | Clements..................... | 192/67 (A) |
| 3,433,338 | 3/1969 | Clements..................... | 192/67 (A) |

Primary Examiner—Allan D. Herrmann
Attorney—Woodcock, Washburn, Kurtz & Mackiewicz ABSTRACT: In a synchronous self-shifting clutch comprising a toothed intermediate member constrained for helical movement into and out of toothed engagement with another clutch part, a system of Belleville washers serves as a stop under conditions of normal positive torque to prevent relative axial movement of the toothed intermediate member and the said toothed clutch part beyond their relative axial positions of normal toothed interengagement. Under a predetermined excessive positive torque overload the Belleville washers yield so as to permit relative axial movement of the said toothed parts beyond their normal positions of toothed interengagement whilst still remaining in toothed interengagement.

SYNCHRONOUS SELF-SHIFTING CLUTCH WITH YIELDING MEANS

This invention relates to synchronous self-shifting toothed clutches of the type comprising an input clutch member and an output clutch member, and clutch-actuating mechanism operative upon passage of the said clutch members through rotational synchronism, said mechanism including an intermediate member constrained for helical movement relative to one of said clutch members to effect interengagement of the coacting clutch teeth.

In a conventional synchronous self-shifting toothed clutch of the above type the intermediate member is provided with clutch teeth, and the clutch member relative to which it is relatively helically movable is generally termed the second clutch member. The other clutch member, which is generally termed the first clutch member, is provided with clutch teeth, and helical movement of the intermediate member relative to the second clutch member in one direction effects interengagement of the coacting clutch teeth, viz the clutch teeth of the intermediate member and the clutch teeth of the first clutch member. Means, e.g. pawl and ratchet mechanism, are normally provided for shifting the intermediate member precisely into initial toothed interengagement with the first clutch member when upon relative rotation of the first and second clutch members in one direction, the said clutch members pass through rotational synchronism. The subsequent interaction of the two sets of clutch teeth draws the intermediate member into full-toothed engagement with the first clutch member. Further movement of the intermediate member in the same direction such as would shift its clutch teeth beyond full engagement with the clutch teeth of the first clutch member, is prevented by a stop, which is generally in the form of an axial stop on the second clutch member. The clutch is then capable of transmitting torque in the direction that tends to keep the clutch engaged; whereas in the absence of a control lock the reversal of the direction of relative rotation of the input and output clutch members causes the clutch to disengage.

In the following description it will be convenient to refer to torque that tends to keep the clutch engaged as positive torque, and to use the term negative torque for torque that tends to disengage the clutch.

In the event of sudden high positive torque overload on the system, damage may be caused to the clutch and/or to associated gearing and shafts. An example of a case in which such a positive torque overload may arise is a turbine/generator set wherein a synchronous self-shifting clutch is provided in the transmission between the turbine and an AC generator. The clutch and transmission are rated to cater for the normal maximum torque when the generator is at full load, but in the event of an electrical dead short circuit on the generator a violent oscillating torque is imposed on the generator rotor, which oscillating torque can persist for several cycles until the circuit breaker is automatically tripped out.

The stresses due to such a short circuit condition arising in the transmission between the turbine and the generator may be of the order of 10 times the normal full load torque. If gearing e.g. reduction gearing is used between the turbine and the generator such high stresses may cause damage to the gearing.

If the clutch is in the engaged condition, as would be normal, when such a dead short circuit condition occurs, there is practically no torsional resilience in the clutch, and even when the clutch includes a dashpot to cushion the engagement motion of the clutch it cannot seem to damp the very high overload torque effect that results from the short circuit since the initial high peak stress is in the positive torque sense, which will hold the clutch in engagement, and the high overload torque will be transmitted through the clutch to the gearing.

A somewhat similar overload torque problem can arise in the event of malsynchronization when the AC generator is running at substantially synchronous speed and the circuit breaker is closed to connect the generator to the mains. In such a case there are two possibilities to be considered, viz high negative and high positive transient torque conditions in the system including the clutch:

a. if at the instant at which the circuit is closed the AC generator momentarily accelerates, this causes a negative torque pulse to be applied to the clutch such as to cause the intermediate member to move partially out of full-toothed engagement with the first clutch member. If the clutch is provided with a double-acting dashpot, as described in British Pat. Specification No. 974,937, this movement of the intermediate member is damped by the dashpot. Upon the reversal of torque that follows an instant later, the return of the intermediate member into dull-toothed engagement with the first clutch member is also damped by the dashpot.

b. if at the instant at which the circuit is closed the AC generator is momentarily violently retarded, this imposes a heavy positive torque overload pulse on the clutch, and since the clutch is in full driving engagement and has little torsional resilience a severe shock load will be imposed on the system.

The object of the present invention is to make provision within the clutch for the diminution of positive torque overload in excess of a predetermined value when the clutch is in the engaged condition.

In accordance with the invention a synchronous self-shifting toothed clutch of the type first referred to herein includes resilient stop means associated with said intermediate member, said stop means being arranged to serve as a fixed stop for limiting the helical movement of said intermediate member relative to said one clutch member under conditions of normal positive torque whereby relative axial movement of the toothed clutch members beyond their relative positions of normal toothed interengagement is prevented, said stop means being capable of limited yielding motion under excess pressure exerted thereon by the intermediate member and corresponding to a predetermined positive torque overload whereby to permit relative axial movement of said toothed clutch members beyond their relative positions of normal toothed interengagement whilst still remaining in toothed interengagement.

Figure 1A:
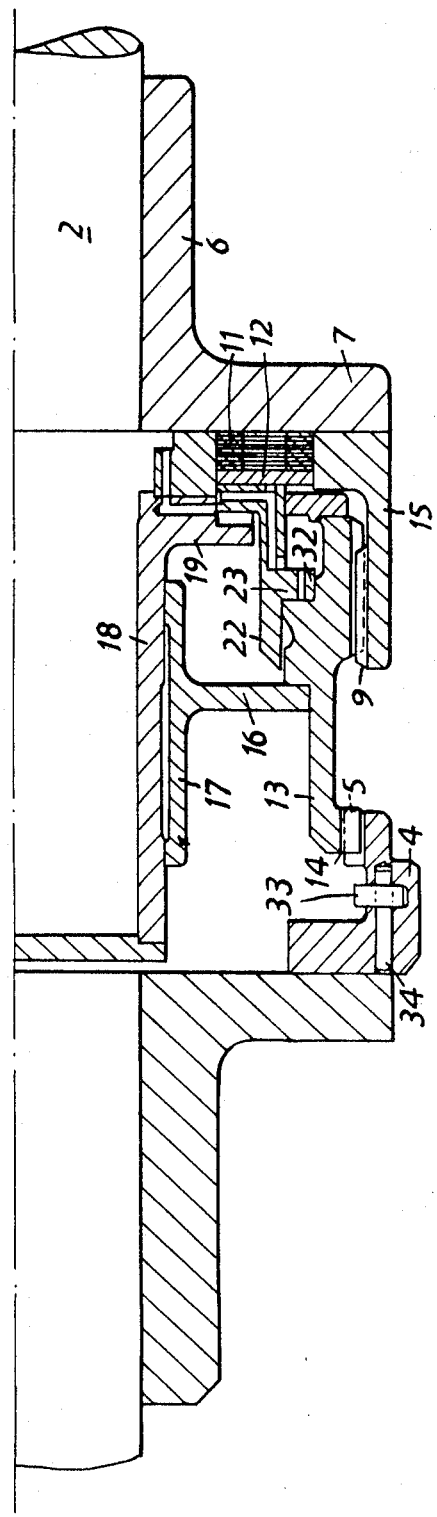
Figure 2:
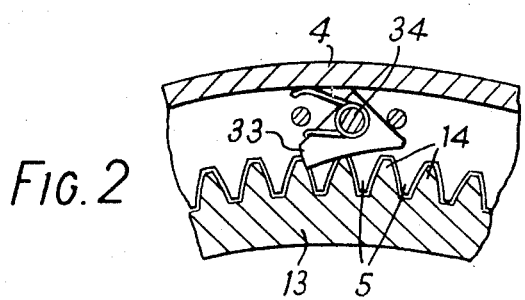
Figure 3:
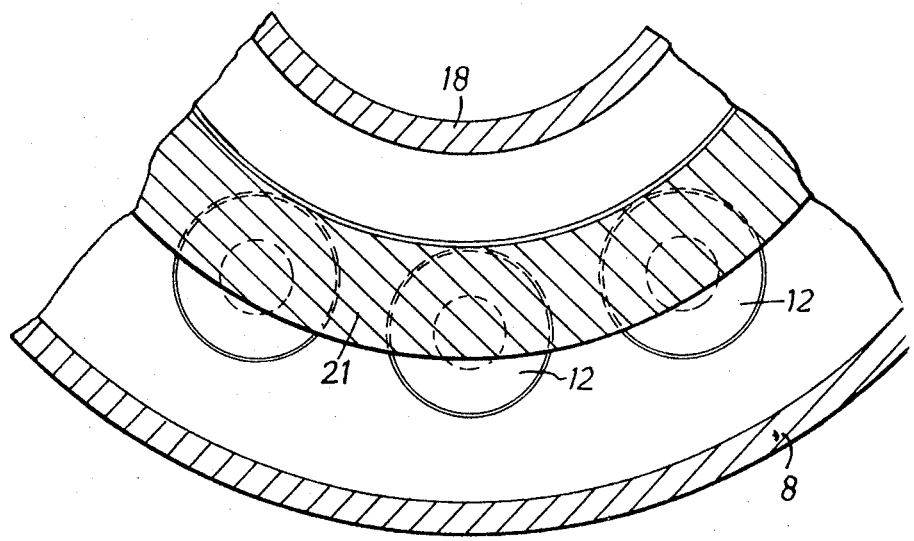

An embodiment of the invention is illustrated in the accompanying drawings, in which:

FIG. 1 is a view of the clutch in longitudinal section, the upper half of the FIG. showing the clutch disengaged, and the lower half of the FIG. showing the clutch disengaged, and the lower half of the FIG. showing the clutch engaged, FIG. 1a is a view in longitudinal section of the lower half of the clutch of FIG. 1, showing the clutch in an overload torque condition, FIG. 2 is a detail view in section on the line II–II of FIG. 1, and FIG. 3 is a detail view in section on the line III–III of FIG. 1.

Referring to the drawings, the synchronous self-shifting clutch shown is assumed to be connected in the transmission between a turbine and an AC generator. A shaft 1 drivably connected to the AC generator (not shown) carries a flanged hub 3 constituting the first clutch member, and a shaft 2 drivably connected to the turbine (not shown) carries a flanged hub 6 constituting the second clutch member. It will be convenient to describe the clutch as viewed on FIG. 1, viz with the first clutch member 3 at the left-hand end of the clutch and the second clutch member 6 at the right-hand end thereof.

The flanged hub 3 is formed with a radially outwardly projecting flange 3', to the outer periphery of which is bolted an annular member 4 formed with a ring of internal clutch teeth 5. The hub 6 is formed with a radially outwardly projecting annular flange 6' to the periphery of which is bolted an annular member 8 formed with a ring of internal left-handed helical spines 9, and provided, on a smaller radius than the spines 9, with a circular array of round holes 10 in each of which are located resiliently compressible means constituted by a plurality of Belleville washers 11 arranged coaxially, the right-hand washer of each plurality being in contact with the flange 6', and there being provided at the left-hand end of each plurality a circular disc 12 which constitutes a thrust pad and which is slidable axially in the respective hole 10.

The clutch also includes and intermediate member, which comprises a sleeve 13 formed with a ring of external clutch teeth 14 at its left-hand end and with external helical splines 15 at its right-hand end, the spines 15 being engaged with the internal helical splines 9. The external clutch teeth 14 are arranged so that with the clutch in the disengaged condition they are located to the left of the internal clutch teeth 5, as shown in the upper part of FIG. 1. The sleeve 13 is connected by an annular flange 16 integral with a sleeve 17 which is on a smaller radius than the sleeve 13 and is slidable on the external surface of a guide sleeve 18 which is formed at its right-hand end with a radially outwardly projecting annular flange 19. The radially outer part of the flange 19 is formed with an annular recess 20 into which extends a radially inwardly projecting annular flange 21 formed on the right-hand end of sleeve 22 which forms part of a dashpot piston assembly, the right-hand face of the flange 21 being in contact with the thrust pads 12.

A radially outwardly projecting annular flange 23, constituting a dashpot piston, is formed on the sleeve 22 and projects into a radially inwardly open annular cavity 24 formed in the right-hand end of the intermediate member, and closed by a ring 25, the ring 25 and the end wall 26 of the cavity being in sliding contact with the outer surface of the sleeve 22 so as to form a dashpot chamber. Oil feed ducts 27, 28, 29, 30 and 31 serve to supply oil to the dashpot chamber at the right-hand side of the piston 23, and transfer ducts 32 are formed in the piston 23. With the clutch in the disengaged condition, shown in the upper half of FIG. 1, the position of the capacity 24, which is movable with the intermediate member 13, is such that the piston 23 is at the right-hand end of the dashpot chamber, and when the clutch is in the engaged condition, shown in the lower half of FIG. 1, the piston 23 is at the left-hand end of the dashpot chamber. The dashpot chamber is so formed that over the major part of the travel of the intermediate member 13 from the position corresponding to clutch disengagement to the position corresponding to clutch engagement a relatively wide passage is available around the outer periphery of the piston 23 for the flow of damping liquid from the left-hand side of the piston to the right-hand side thereof, and the movement of the intermediate member 13 is relatively lightly damped; whereas when the intermediate member approaches the position of full-toothed engagement with the clutch teeth 5 only a restricted passage through the ducts 32 is available for the flow of damping liquid from the left-hand side of the piston to the right-hand side, hence the final movement of the intermediate member 13 to the fully engaged position is strongly cushioned.

The annular member 4 carries pawls 33 mounted on pawl pins 34 and arranged to the left of the internal clutch teeth 5 and adapted to cooperate with the external clutch teeth 14 when the clutch is disengaged. The noses of the pawls point in anticlockwise direction as viewed from the left-hand end of the clutch.

When the shaft 1 rotates in clockwise direction, as viewed from the left-hand end, relative to the shaft 2, the clutch is in the disengaged condition and the pawls 33 ratchet relatively to the external clutch teeth 14, whereas when the shaft 2 tends to overtake the rotation of shaft 1 and passes through rotational synchronism therewith, external clutch teeth 14 engage pawls 33 and the intermediate member 13 is shifted helically relative to the shaft 2 (to the right in FIG. 1), initiating precise interengagement of the clutch teeth 14 and the clutch teeth 5. When the interengagement of the clutch teeth 14 and 5 has been initiated, the interaction of the clutch teeth draws the intermediate member 13 to the right into full-toothed engagement.

When the clutch is engaged, the left-hand end wall 26 of the cavity 24 is in contact with the left-hand face of the piston 23, which is integral with the flange 21 in contact with the thrust pads 12. The Belleville washer assemblies are preloaded so that under normal full torque loading of the system they do not yield, the thrust pads 12 functioning as fixed axial abutment for preventing movement of the intermediate member to the right beyond the position, shown in the lower half of FIG. 1, corresponding to full interengagement of the clutch teeth 14 and 5. However, should a positive overload torque above a predetermined high value be imposed on the clutch, the interaction of the helical splines 9 and 15 causes the intermediate member 13 to exert, via the end wall 26, the piston 23 and the flange 21, an increased axial pressure on the thrust pads 12, causing them to yield, i.e. the Belleville washers 11 are compressed axially, with relative angular movement between the shafts 1 and 2. This relative angular movement of the shafts 1 and 2 is accompanied by movement of the intermediate member 13 beyond its position of normal toothed interengagement with the second clutch member 6 (as shown in FIG. 1a) and provides the extra resilience required to reduce the shaft stresses when under high overload torque imposed on the clutch in the positive sense. During the said relative angular movement of the shafts 1 and 2, which is limited by the extent to which the Belleville washers can be compressed, the clutch teeth 5 and 14 remain interengaged.

Upon reversal of the high overload torque the intermediate member 13 is returned to its normal position corresponding to full clutch engagement, due to the compressed Belleville washers 11 expanding to their normal prestressed condition. It will be seen that the invention provides torsional resilience of the clutch for high overload torque when in the fully engaged condition.

The dashpot 23, 25, 26 may be omitted, the intermediate member 13 then being arranged to act directly on the thrust pads 12.

I claim:

1. A synchronous self-shifting toothed clutch comprising an input clutch member and an output clutch member, and clutch-actuating mechanism operative upon passage of said clutch members through rotational synchronism, said mechanism including an intermediate member and means constraining said intermediate member for helical movement relative to one of said clutch members whereby to effect interengagement of the coacting toothed members of the clutch, the improvement comprising resilient stop means associated with said intermediate member, said stop means being arranged to serve as a fixed stop for limiting the helical movement of said intermediate member relative to said one clutch member in the clutch engaging direction under conditions of normal positive torque whereby to prevent relative axial movement of said coacting toothed members, and said resilient stop means being capable of limited yielding motion under excess pressure exerted on said stop means by said intermediate member and corresponding to a predetermined torque overload, whereby to permit relative axial movement of said toothed clutch members beyond their relative axial positions of normal toothed interengagement whilst still remaining in toothed interengagement.

2. A synchronous self-shifting clutch according to claim 1, wherein said resilient stop means include a system of Belleville washers.

3. A synchronous self-shifting clutch according to claim 1, including a dashpot for cushioning engagement of the clutch, said dashpot including a cylinder movable with said intermediate member and a piston, and an element integral with said piston, said resilient stop means being operatively arranged between said element and the one of said clutch members relative to which said intermediate member is constrained for helical movement.

4. A turbine-generator set having the improvement that a clutch according to claim 1 is included in the transmission between a turbine and a generator.